(12) United States Patent
Kim et al.

(10) Patent No.: US 10,361,889 B2
(45) Date of Patent: Jul. 23, 2019

(54) WIRELESS COMMUNICATION APPARATUS FOR INCREASING THROUGHPUT USING MIMO IN LOS ENVIRONMENT AND METHOD THEREFOR

(71) Applicant: ELECTRONICS AND TELECOMMUNICATIONS RESEARCH INSTITUTE, Daejeon (KR)

(72) Inventors: Kwang Seon Kim, Sejong-si (KR); Min Soo Kang, Daejeon (KR); Bong Su Kim, Daejeon (KR); Myung Sun Song, Daejeon (KR); Woo Jin Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 11 days.

(21) Appl. No.: 15/459,749

(22) Filed: Mar. 15, 2017

(65) Prior Publication Data

US 2017/0272280 A1  Sep. 21, 2017

(30) Foreign Application Priority Data

Mar. 17, 2016  (KR) .................. 10-2016-0032282

(51) Int. Cl.
*H04W 4/00* (2018.01)
*H04L 25/02* (2006.01)
(Continued)

(52) U.S. Cl.
CPC ....... *H04L 25/0228* (2013.01); *H04B 7/0413* (2013.01); *H04W 24/02* (2013.01)

(58) Field of Classification Search
CPC .................................................. H04L 25/0228
See application file for complete search history.

(56) References Cited

U.S. PATENT DOCUMENTS

| 7,149,199 B2 * | 12/2006 | Sung | ................. | H04J 13/00 |
| | | | | 370/330 |
| 7,471,899 B2 * | 12/2008 | Kim | ................. | H04J 14/0226 |
| | | | | 14/226 |

(Continued)

*Primary Examiner* — Guang W Li
(74) *Attorney, Agent, or Firm* — Rabin & Berdo, P.C.

(57) ABSTRACT

The present disclosure relates to a wireless communication apparatus capable of increasing throughput using MIMO in an LOS environment and a method for the same. A wireless communication apparatus based on the LOS-MIMO technique may comprise a multi-link configuration unit, a frequency response correction unit, a signal compensation unit, and a feedback unit. In the apparatus, an additional LOS-MIMO equalizer is used at the front of an LOS-MIMO estimator and a coding unit in order to compensate in-band frequency characteristics of frequency response characteristics estimated by the LOS-MIMO estimator and a signal channel estimator, whereby the LOS-MIMO estimation performance can be remarkably enhanced. Also, precise separation of multiplexed signals through the above-described LOS equalizer can make it possible to increase transmission capacity by using the LOS-MIMO which can be applied to high-order mode (e.g., over 16 quadrature amplitude modulation (QAM)) digital communications.

6 Claims, 7 Drawing Sheets

(51) Int. Cl.
*H04B 7/0413* (2017.01)
*H04W 24/02* (2009.01)

(56) References Cited

U.S. PATENT DOCUMENTS

| | | | | |
|---|---|---|---|---|
| 9,020,011 | B1* | 4/2015 | Hiebert | H04L 7/02 375/219 |
| 9,025,690 | B2* | 5/2015 | Ladvanszky | H04L 25/03159 370/334 |
| 9,077,407 | B2* | 7/2015 | Koren | H04B 7/0473 |
| 9,386,465 | B2* | 7/2016 | Forenza | H04B 7/0626 |
| 9,641,215 | B2* | 5/2017 | Lindgren | H04B 7/0613 |
| 2009/0296846 | A1* | 12/2009 | Maru | H04B 7/0413 375/267 |
| 2010/0015922 | A1* | 1/2010 | Kawai | H04B 7/0413 455/63.1 |
| 2011/0003607 | A1* | 1/2011 | Forenza | H04B 7/0413 455/501 |
| 2012/0033965 | A1* | 2/2012 | Zhang | H04B 10/611 398/38 |
| 2012/0224651 | A1* | 9/2012 | Murakami | H04L 25/03171 375/295 |
| 2013/0216012 | A1* | 8/2013 | Weinholt | H04B 7/084 375/347 |
| 2014/0016687 | A1* | 1/2014 | Ladvanszky | H04L 25/03159 375/230 |
| 2014/0037029 | A1* | 2/2014 | Murakami | H04L 27/34 375/340 |
| 2014/0269864 | A1* | 9/2014 | Aparin | H04B 1/40 375/221 |
| 2015/0116146 | A1* | 4/2015 | Dickman | G01S 19/23 342/357.51 |
| 2015/0180415 | A1* | 6/2015 | Fernandes Barros | H03D 3/009 375/219 |
| 2016/0127059 | A1* | 5/2016 | Bao | H04B 17/3913 370/252 |
| 2016/0134345 | A1* | 5/2016 | Maru | H04B 7/0456 375/267 |
| 2016/0344457 | A1* | 11/2016 | Olsson | H04B 7/0413 |
| 2017/0212204 | A1* | 7/2017 | Amizur | G01S 3/14 |

* cited by examiner

WIRELESS COMMUNICATION APPARATUS FOR INCREASING THROUGHPUT USING MIMO IN LOS ENVIRONMENT AND METHOD THEREFOR

CLAIM FOR PRIORITY

This application claims priority to Korean Patent Application No. 2016-0032282 filed on Mar. 17, 2016 in the Korean Intellectual Property Office (KIPO), the entire contents of which are hereby incorporated by reference.

BACKGROUND

1. Technical Field

The present disclosure relates to a wireless communication technology using line-of-sight (LOS) multi-input multi-output (MIMO), and more particularly, to a wireless communication apparatus capable of increasing throughput using the MIMO in the LOS environment and a method for the same.

2. Related Art

In the conventional MIMO system in the LOS channel environment, transmit/receive antennas are arranged so that an arrival path difference of a signal transmitted from each transmit antenna to each receive antenna is 90 degrees ($\lambda/4$), and a simple operation is performed on a signal received at the receive antenna in order to recover an original signal for the received signal.

However, there is a problem that installation intervals among the antennas are determined fixedly according to signal frequencies and link distances between the transmit and receive antennas in order to make the arrival path difference of 90 degrees.

SUMMARY

Accordingly, exemplary embodiments of the present disclosure are provided to substantially obviate one or more problems due to limitations and disadvantages of the related art.

Exemplary embodiments of the present disclosure provide a wireless communication apparatus capable of increasing transmission capacity (throughput) using MIMO in an LOS environment (referred to as 'LOS-MIMO') and a method for the same. According to exemplary embodiments of the present disclosure, in the wireless communication system using the LOS-MIMO technique, an additional LOS-MIMO equalizer is used at the front of an LOS-MIMO estimator and a coding unit in order to compensate in-band frequency characteristics of frequency response characteristics estimated by the LOS-MIMO estimator and a signal channel estimator, whereby the LOS-MIMO estimation performance can be remarkably enhanced. Also, accurate separation of multiplexed signals through the above-described LOS equalizer can make it possible to increase the transmission capacity by using the LOS-MIMO which can be applied to high-order mode (e.g., over 16 quadrature amplitude modulation (QAM)) digital communications.

Technical objects of the present disclosure are not limited to the aforementioned technical objects and other technical objects which are not mentioned will be apparently appreciated by those skilled in the art from the following description.

In order to achieve the above-described objective, an aspect of the present disclosure provides a wireless communication apparatus based on a line-of-sight (LOS) multiple input and multiple output (MIMO) technique. The apparatus may comprise a multi-link configuration unit configured to configure multiple links by using at least one transmit antenna and at least one receive antenna; a frequency response correction unit for estimating and correcting frequency responses of signals received from the at least one transmit antenna; and a signal compensation unit for estimating and compensating phases and sizes of the signals received from the at least one transmit antenna so that a path difference between the signals received from the at least one transmit antenna becomes 90 degrees.

The apparatus may further comprise a feedback unit for estimating and correcting the frequency responses of signals received from the at least one transmit antenna by using channel estimation information received from a channel estimator.

Here, multipath frequency responses of the signals received from the at least one transmit antenna may be estimated and corrected through a multipath frequency response estimation and correction step, and frequency response characteristics of the corrected signals may be estimated and compensated through a channel estimation and compensation step.

In order to achieve the above-described objective, another aspect of the present disclosure provides a wireless communication method based on a line-of-sight (LOS) multiple input and multiple output (MIMO) technique. The method may comprise configuring multiple links by using at least one transmit antenna and at least one receive antenna; estimating and correcting frequency responses of signals received from the at least one transmit antenna; and estimating and compensating phases and sizes of the signals received from the at least one transmit antenna so that a path difference between the signals received from the at least one transmit antenna becomes 90 degrees.

The method may further comprise estimating and correcting the frequency responses of signals received from the at least one transmit antenna by using received channel estimation information.

Here, multipath frequency responses of the signals received from the at least one transmit antenna may be estimated and corrected through a multipath frequency response estimation and correction step, and frequency response characteristics of the corrected signals may be estimated and compensated through a channel estimation and compensation step.

According to the present disclosure, a structure that reflects a frequency response on a reception side, but frees antenna intervals without a feedback is provided. The provided apparatus and method can improve the LOS-MIMO estimation performance for broadband signals, improve LOS-MIMO estimation performance, and precisely separate multiplexed signals to prevent performance degradation due to interference signals. Thus, it can be applied to higher-order mode (e.g., over 16 QAM) digital communications.

BRIEF DESCRIPTION OF DRAWINGS

Exemplary embodiments of the present disclosure will become more apparent by describing in detail exemplary embodiments of the present disclosure with reference to the accompanying drawings, in which.

DESCRIPTION OF EXEMPLARY EMBODIMENTS

Figure 1:
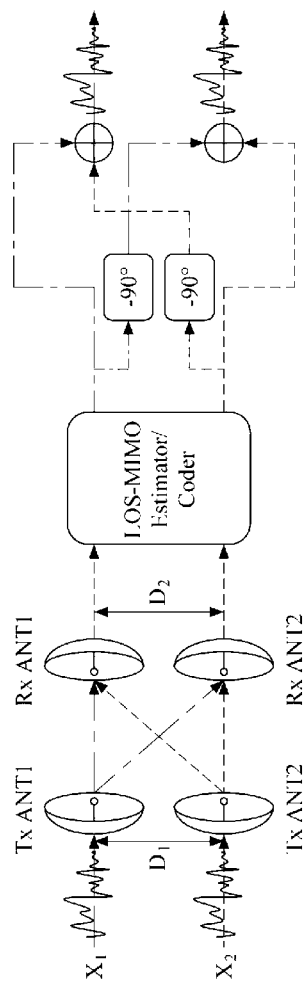
FIG. 1 is a diagram illustrating a structure of a conventional 2×2 LOS MIMO wireless communication apparatus.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Combinations of respective blocks in an accompanying block diagram and respective operations in a flowchart may be performed by computer program instructions. These computer program instructions can be mounted on a processor of a general purpose computer, a special purpose computer, or other programmable data processing equipment, and thus the instructions performed by the processor of the computer or other programmable data processing equipment generate a means for performing functions described in the respective blocks of the block diagram or the respective operations of the flowchart. To implement functions in a specific way, these computer program instructions can be stored in a computer-usable or computer-readable memory capable of aiming for a computer or other programmable data processing equipment, so that the instructions stored in the computer-usable or computer-readable memory can also produce a manufactured item including an instruction means for performing functions described in the respective blocks of the block diagram or the respective operations of the flowchart.

In addition, each block or operation may indicate a part of a module, a segment or a code including one or more executable instructions for executing specific logical function(s). It should be noted that mentioned functions described in blocks or operations can be executed out of order in some alternative embodiments. For example, two consecutively shown blocks or operations can be performed substantially at the same time, or can be performed in a reverse order according to the corresponding functions.

Hereinafter, exemplary embodiments according to the present disclosure will be described in detail by referring to accompanying drawings. However, the exemplary embodiments according to the present disclosure may be changed into various forms, and thus the scope of the present disclosure is not limited to the exemplary embodiments which will be described. The exemplary embodiments are provided to assist the one of ordinary skill in the art. in gaining a comprehensive understanding of the methods, apparatuses, and/or systems described herein.

FIG. 1 is a diagram illustrating a structure of a conventional 2×2 LOS MIMO wireless communication apparatus.

Referring to FIG. 1, illustrated is a structure of a 2×2 LOS MIMO wireless communication apparatus according to the related art having a channel coding unit for estimating a path difference of signals received from transmit antennas disposed with an arbitrary antenna interval, and finally obtaining a channel response forming 90 degrees at a received signal.

The structure of the 2×2 LOS MIMO wireless communication apparatus according to the related art as illustrated in FIG. 1 is a structure that can be used without feedback. However, since it uses a method that estimates only gain and phase information, in future wireless systems adopting millimeter wave bands in which the LOS-MIMO technique is usually used or broadband signals, there may be a problem that the performance is drastically degraded due to in-band frequency characteristics according to antennas, RF transceivers, and installation environments in the system configuration, even in the LOS environment.

Figure 2:
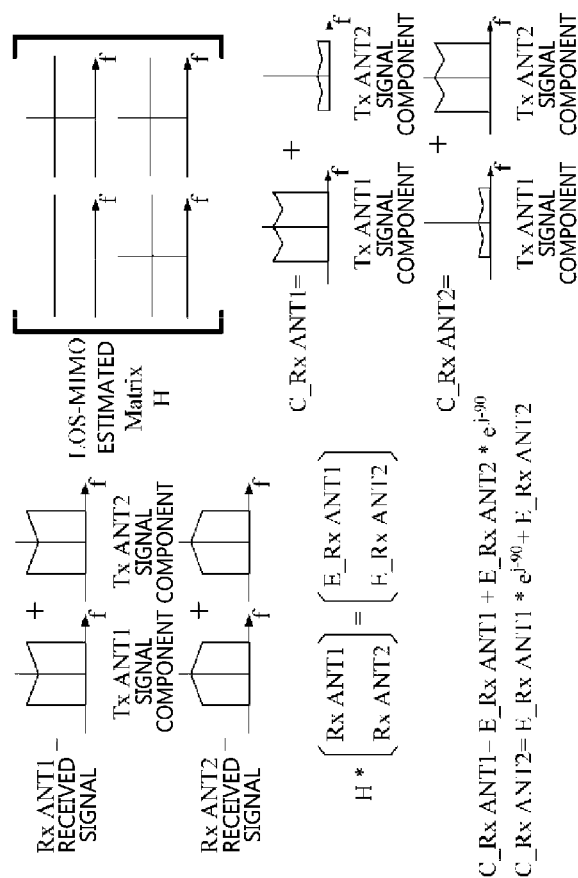
FIG. 2 is a diagram illustrating signal processing according to reception characteristics in a 2×2 LOS MIMO wireless communication apparatus according to the related art.

FIG. 2 is a diagram illustrating signal processing according to reception characteristics in a 2×2 LOS MIMO wireless communication apparatus according to the related art.

As illustrated in FIG. 2, in case of non-flat frequency response characteristics, even if accurate frequency and phase information are estimated, both of a TxANT1 signal component and a TxANT2 signal component may exist in an RxANT1 signal. Here, the TxANT1 signal may refer to a signal transmitted from a transmit antenna TxANT1, and the TxANT2 signal may refer to a signal transmitted from a transmit antenna TxANT2. Also, the RxANT1 signal may refer to a signal received at a receive antenna RxANT1.

Similarly, both of a TxANT1 component and a TxANT2 signal component may be present in a signal received at an RxANT2 antenna.

In this reason, a signal of a specific transmit antenna may act as an interference signal to signals of other transmit antennas, thereby deteriorating signal-to-interference-plus-noise ratio (SINR) characteristics.

Figure 3:
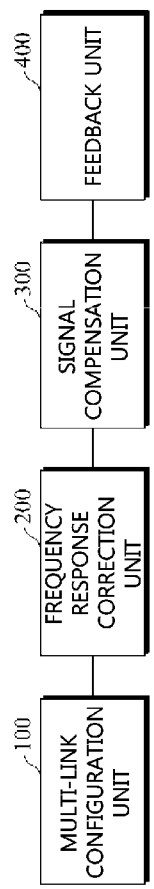
FIG. 3 is a block diagram of a wireless communication apparatus capable of increasing transmission capacity by using LOS-MIMO according to an exemplary embodiment of the present disclosure.

FIG. 3 is a block diagram of a wireless communication apparatus capable of increasing transmission capacity by using LOS-MIMO according to an exemplary embodiment of the present disclosure.

Referring to FIG. 3, a wireless communication apparatus according to an exemplary embodiment of the present disclosure may comprise a multi-link configuration unit 100, a frequency response correction unit 200, and a signal compensation unit 300.

The multi-link configuration unit 100 may use at least one transmit antenna and at least one receive antenna in order to configure multiple links.

The frequency response correction unit 200 may estimate and correct the frequency response of the signal received from each of the at least one transmit antenna.

The signal compensation unit 300 may estimate and compensate phases and sizes of the signals received from the at least one transmit antenna so that a path difference of the signals received from the respective transmit antennas form 90 degrees with each other.

According to an exemplary embodiment, the apparatus may further comprise a feedback unit for estimating and correcting the frequency response of the signal received from each of the transmit antennas using the channel estimation information received from the channel estimator.

The structure of the wireless communication apparatus further including the feedback unit according to the above embodiment will be described in more detail with reference to FIG. 8.

According to an exemplary embodiment of the present disclosure, a multipath frequency response estimation and correction step for estimating and correcting a multipath frequency response of the signal received from each transmit antenna and a channel estimation and compensation step for compensating frequency response characteristics of the corrected signal may be performed.

Figure 4:
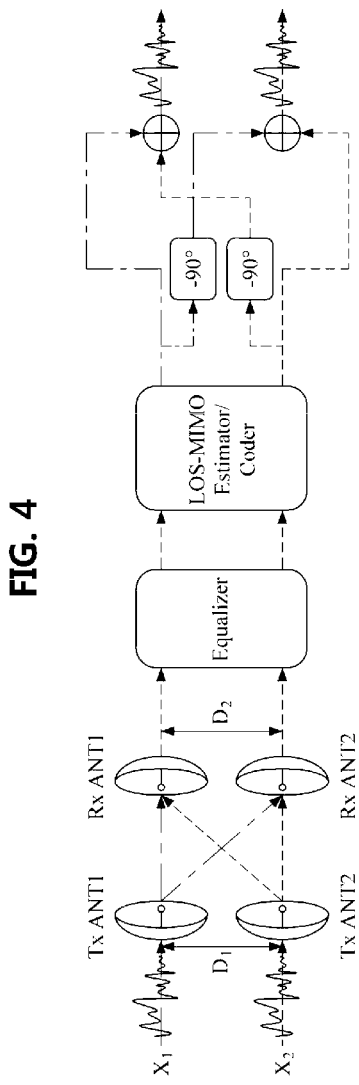
FIG. 4 is a diagram illustrating a structure of a wireless communication apparatus using a 2×2 LOS-MIMO according to an exemplary embodiment of the present disclosure.

FIG. 4 is a diagram illustrating a structure of a wireless communication apparatus using a 2×2 LOS-MIMO according to an exemplary embodiment of the present disclosure.

Referring to FIG. 4, the interval between the transmit antennas TxANT1 and TxANT2 may be assumed to be D1, and the interval between the receive antennas RxANT1 and RxANT2 may be assumed to be D2. Also, a link distance between the TxANT1 and the RxANT1 is assumed to be R. In the conventional method, the per-path phases and sizes of signals received at RxANT1 and RxANT2 from TxANT1 and the per-path phases and sizes of signals received at RxANT1 and RxANT2 from TxANT2 may be estimated, and corrected so that the paths have a difference of 90 degrees. However, in the present method, the frequency characteristics of each path may be estimated and corrected first, and then the phase delay for each path may be corrected.

Figure 5:
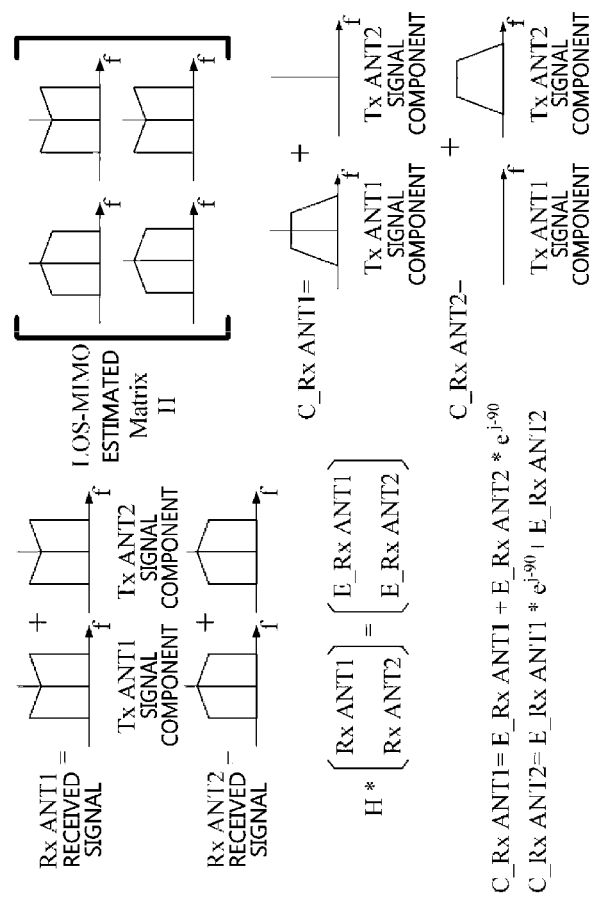
FIG. 5 is a diagram illustrating signal processing according to reception characteristics in a wireless communication apparatus using a 2×2 LOS MIM according to an exemplary embodiment of the present disclosure.

FIG. 5 is a diagram illustrating signal processing according to reception characteristics in a wireless communication apparatus using a 2×2 LOS MIM according to an exemplary embodiment of the present disclosure.

In the case of non-flat frequency response characteristics, even if the conventional 2×2 LOS MIMO wireless communication apparatus estimates accurate phase and size information, since both the TxANT1 signal component and TxANT2 signal component are present in the signal received at RxANT1, the SINR may deteriorate. On the contrary, referring to FIG. 5, a wireless communication apparatus according to an exemplary embodiment of the present disclosure can precisely separate two signal components in a receive antenna by first correcting the frequency response characteristics, so that signals may not act as interfering signals to each other.

Figure 6:
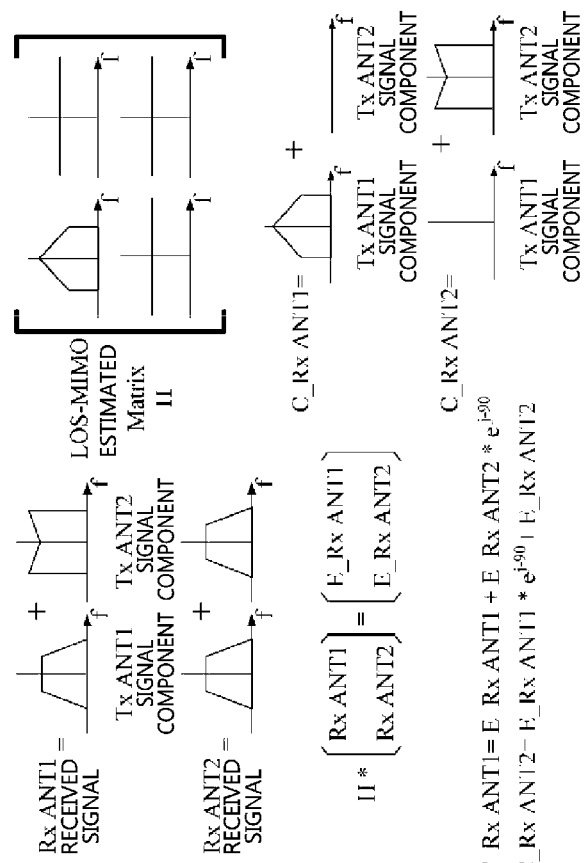
FIG. 6 is a diagram illustrating signal processing according to reception characteristics in a wireless communication apparatus using a 2×2 LOS MIMO according to an exemplary embodiment of the present disclosure when frequency response characteristics differ only in one path.

FIG. 6 is a diagram illustrating signal processing according to reception characteristics in a wireless communication apparatus using a 2×2 LOS MIMO according to an exemplary embodiment of the present disclosure when frequency response characteristics differ only in one path.

Referring to FIG. 6, even in case that a frequency response characteristic is different for only one path, the wireless communication apparatus according to an exemplary embodiment may accurately separate the received signal into two signal components even when different frequency characteristic is generated in only the path from TxANT2 to RxANT1.

In the above case, although the frequency response characteristics of the separated signals are distorted, they may be compensated by channel estimation and compensation functions possessed by a general digital receiver, thereby preventing characteristic deterioration due to an interference signal.

Figure 7:
FIG. 7 is a diagram illustrating a preamble structure according to an exemplary embodiment of the present disclosure.

FIG. 7 is a diagram illustrating a preamble structure according to an exemplary embodiment of the present disclosure.

As described above, in an exemplary embodiment of the present disclosure, a preamble section (e.g., preamble 2a or preamble 2b) according to the preamble structure of an exemplary embodiment, during which only one transmit antenna performs transmission, may be used in order to accurately estimate the phase, size, and frequency response characteristics of the LOS MIMO.

Figure 8:
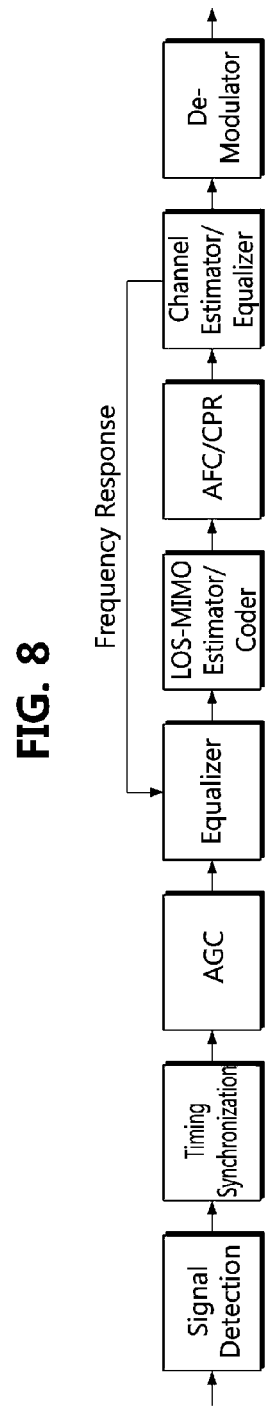
FIG. 8 is a diagram illustrating a structure of a wireless communication apparatus according to an exemplary embodiment in which a feedback unit is further used.

FIG. 8 is a diagram illustrating a structure of a wireless communication apparatus according to an exemplary embodiment in which a feedback unit is further used.

Referring to FIG. 8, illustrated is a structure of a wireless communication apparatus according to an exemplary embodiment in which a feedback unit implemented by applying a conventional digital signal processing block is used.

According to an exemplary embodiment, a series of processes of signal detection, time synchronization, automatic gain control (AGC), automatic frequency control (AFC), phase correction, channel estimation and correction, and demodulation used in an usual digital radio receiver may be performed. Also, the LOS-MIMO estimator and coder for size and phase estimation may be added to perform a feedback function.

According to an exemplary embodiment, a frequency response may be identified in a channel estimator using the preamble structure of FIG. 7, and information on the frequency response may be fed back to an equalizer so that correction may be performed based on the feedback information at the front of the LOS-MIMO estimator and the coder.

Figure 9:
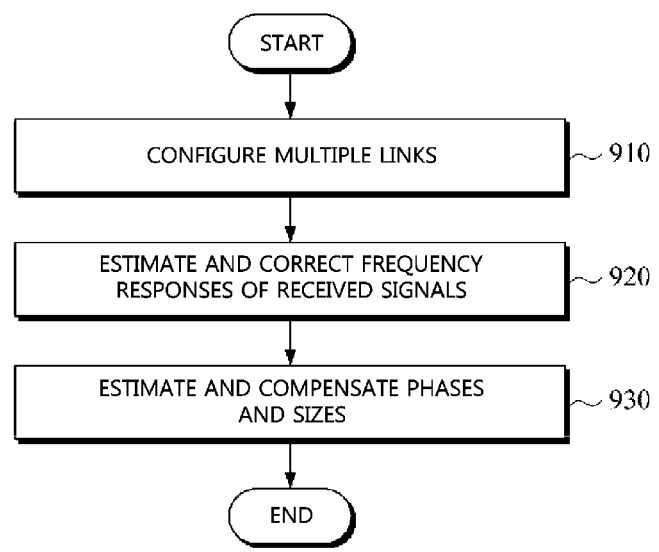
FIG. 9 is a flowchart explaining a wireless communication method capable of increasing transmission capacity using LOS-MIMO according to an exemplary embodiment of the present disclosure.

FIG. 9 is a flowchart explaining a wireless communication method capable of increasing transmission capacity using LOS-MIMO according to an exemplary embodiment of the present disclosure.

Multiple links may be configured (S910).

In the step 5910, the multiple links may be configured by using at least one transmit antenna and at least one receive antenna.

Frequency response characteristics of a received signal may be estimated and corrected (S920).

In the step 5920, frequency response characteristics of the signal received at each receive antenna from the at least one transmit antenna may be estimated and corrected.

Phases and sizes may be estimated and compensated (S930).

According to an exemplary embodiment, phase and size may be estimated and compensated so that a path difference between the signals received from the respective transmit antennas becomes 90 degrees.

According to an exemplary embodiment, a frequency response of a signal received from each of the transmit antennas may be estimated and corrected using the channel estimation information received from the channel estimator.

According to an exemplary embodiment, a channel estimation and correction step may be performed to estimate and correct the multipath frequency response of the signal received from each transmit antenna and to compensate the frequency response characteristic of the corrected signal.

The methods according to exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless communication apparatus based on a line-of-sight (LOS) multiple input and multiple output (MIMO) technique, comprising:
    a first receive antenna receiving a first reception signal including a first transmission signal and a second transmission signal;
    a second receive antenna receiving a second reception signal including the first transmission signal and the second transmission signal;
    a channel estimator estimating a first frequency response of the first transmission signal, and estimating a second frequency response of the second transmission signal;
    an equalizer correcting the first transmission signal based on the estimated first frequency response, and correcting the second transmission signal based on the estimated second frequency response;
    a LOS-MIMO estimator estimating a phase and a size of the corrected first transmission signal, and estimating a phase and a size of the corrected second transmission signal, using a LOS-MIMO estimated matrix; and
    a coder compensating the first signal of the first reception signal based on the estimated phase and size of the corrected first transmission signal, and compensating the second signal of the second reception signal based the estimated phase and size of the corrected second transmission signal, such that a path difference between the corrected first and second transmission signals becomes 90 degrees.

2. The wireless communication apparatus according to claim 1,
    wherein the coder rotates the phase of the first transmission signal of the first reception signal by 90 degrees based on the phase and the size of the corrected first transmission signal, and rotates the phase of the second transmission signal of the second reception signal by 90 degrees based on the phase and the size of the corrected second transmission signal.

3. The wireless communication apparatus according to claim 2,
    wherein the equalizer cancels the second signal of the first reception signal based on the rotated the phase of the second transmission signal of the second reception signal by 90 degrees, and cancels the first signal of the second reception signal based on the rotated the phase of the first transmission signal of the first reception signal by 90 degrees.

4. A wireless communication method based on a line-of-sight (LOS) multiple input and multiple output (MIMO) technique, comprising:
    receiving, by a first receive antenna, a first reception signal including a first transmission signal and a second transmission signal;
    receiving, by a second receive antenna, a second reception signal including the first transmission signal and the second transmission signal;
    estimating, by a channel estimator, a first frequency response of the first transmission signal, and a second frequency response of the second transmission signal;
    correcting, by an equalizer, the first transmission signal based on the estimated first frequency response, and the second transmission signal based on the estimated second frequency response;
    estimating, by a LOS-MIMO estimator using a LOS-MIMO estimated matrix, a phase and a size of the corrected first transmission signal, and a phase and a size of the corrected second transmission signal;
    compensating, by a coder, the first signal received from the first receive antenna based the phase and the size of the corrected first transmission signal, and the second signal received from the second receive antenna based the phase and the size of the corrected second transmission signal, such that a path difference between the corrected first and second transmission signals becomes 90 degrees.

5. The wireless communication method according to claim 4, further comprising rotating, by the coder, the phase of the first transmission signal of the first reception signal by 90 degrees based on the phase and the size of the corrected first transmission signal, and rotating the phase of the second transmission signal of the second reception signal by 90 degrees based on the phase and the size of the corrected second transmission signal.

6. The wireless communication method according to claim 5, further comprising canceling, by the equalizer, the second signal of the first reception signal based on the rotated the phase of the second transmission signal of the second reception signal by 90 degrees, and the first signal of the second reception signal based on the rotated the phase of the first transmission signal of the first reception signal by 90 degrees.

* * * * *